United States Patent [19]

Merchant

[11] Patent Number: 5,539,529
[45] Date of Patent: Jul. 23, 1996

[54] FACSIMILE COMMUNICATION WITH SELECTIVE CALL RECEIVERS

[76] Inventor: Zaffer S. Merchant, 2 Cedar Cir., Lantana, Fla. 33462

[21] Appl. No.: 223,356

[22] Filed: Apr. 4, 1994

[51] Int. Cl.⁶ .............................. H04N 1/00; G08B 5/22
[52] U.S. Cl. ............... 358/400; 358/462; 340/825.44; 455/38.4; 379/56
[58] Field of Search .............................. 358/400, 448, 358/462; 340/825.44; 455/38.1, 38.4; 345/141, 146; 379/56, 57

[56] References Cited

U.S. PATENT DOCUMENTS

| | | | |
|---|---|---|---|
| 3,688,275 | 8/1972 | Fredrickson et al. | 348/146 |
| 4,766,434 | 8/1988 | Matai et al. | 340/825.44 |
| 4,897,733 | 1/1990 | Sakaguchi et al. | 358/433 |
| 4,920,427 | 4/1990 | Hirata | 358/437 |
| 5,307,422 | 4/1994 | Wang | 358/462 |
| 5,323,148 | 2/1994 | Olazabal et al. | 340/825.44 |

*Primary Examiner*—Edward L. Coles, Sr.
*Assistant Examiner*—Thomas D. Lee
*Attorney, Agent, or Firm*—Keith A. Chanroo

[57] ABSTRACT

A selective call receiver (40) includes a receiver (66) for receiving information represented as a bitmap image. The selective call receiver 40 further includes a segmenter (206), coupled to the receiver (66), for segmenting the bitmap image into a text region and a non text region. A subtracter (208) of the selective call receiver (40), coupled to the segmenter (206), subtracts the non text region from the bitmap image and an identifier (210), coupled to the subtracter (208), identifies text lines within the text region of the bitmap image. The selective call receiver (40) also includes a formatter (212), coupled to the identifier (210), for formatting the text lines of the bitmap image; and a display (90), coupled to the formatter (212), for displaying the text lines being formatted.

26 Claims, 7 Drawing Sheets

FACSIMILE COMMUNICATION WITH SELECTIVE CALL RECEIVERS

FIELD OF THE INVENTION

This invention relates in general to facsimile communications and more specifically to a method for providing facsimile communication with selective call receivers.

BACKGROUND OF THE INVENTION

Contemporary selective call receiver communication systems employ messaging schemes that can deliver voice, numeric, or alphanumeric messages to its user. The majority of selective call systems transmit address and message information using a protocol such as GSC (Motorola's Golay Sequential Code) or POCSAG (Great Britain's Post Office Code Standardisation Advisory Group). To originate a message or page, a base station (or selective call terminal) is typically accessed via a Public Switch Telephone Network (PSTN) from a telephone. As a voice message entry device, the telephone is acceptable but when data needs to be entered, an alternative means of entry is desirable. Alternative entry devices such as computer terminals or custom entry devices work well if the originator can convey information to the user in a textual format. Unfortunately, when a user must convey a large amount of information or graphics-type information, existing selective call messaging (paging) systems and data transport protocols do not gracefully allow for the transmission of either long textual messages or messages containing graphical data. This is because selective call receivers are powered by limited energy content battery supplies that are quickly degraded when receiving and displaying long messages. In addition, because of the miniature size of the selective call receiver and its display, the information received is not easily readable and accessible to the user.

One area of growing concern is the ability to send a printed document, for example newspaper articles and reports, via a facsimile machine to a wireline device, for example selective call receivers, equipped with monochrome or liquid crystal display (LCD) screens. However, because the resolution of the display screen of the selective call receivers are much smaller than the format of the newspaper articles or reports being sent, the users of the selective call receivers can only traverse the message by scrolling and panning. Unfortunately, panning is one of the most objectionable demand that can be placed on the users who need to access information that are improperly formatted for small display screen devices such as selective call receivers.

Thus, what is needed is a method and apparatus, in a selective call communication system, for providing facsimile communication that is designed specifically to meet these constraints, namely, by presenting the information in a form suitable for display on a miniature display screen thereby eliminating the need for panning to traverse the information.

SUMMARY OF THE INVENTION

In a selective call communication system, a method of facsimile communication comprises the steps of: (a) retrieving information from a source document; (b) encoding and compressing the information; (c) transferring the information to a selective call terminal; (d) receiving the information at the selective call terminal; (e) processing the information in the selective call terminal; and (f) transmitting the information as a bitmap image which is received by an at least one selective call receiver. In the at least one selective call receiver, a method comprising the steps of: (g) segmenting the bitmap image into a text region and a non text region; (h) subtracting the non text region from the bitmap image; (i) identifying text lines within the text region of the bitmap image; (j) formatting the text lines of the bitmap image; and (k) displaying the text lines being formatted.

A selective call receiver comprise: a receiver for receiving information comprising a bitmap image; a segmenter, coupled to the receiver, for segmenting the bitmap image into a text region and a non text region. A subtracter, coupled to the segmenter, subtracts the non text region from the bitmap image; an identifier, coupled to the subtracter, identifies text lines within the text region of the bitmap image. A formatter, coupled to the identifier, formats the text lines of the bitmap image; and a display, coupled to the formatter, displays the text lines being formatted.

DESCRIPTION OF A PREFERRED EMBODIMENT

Figure 1:
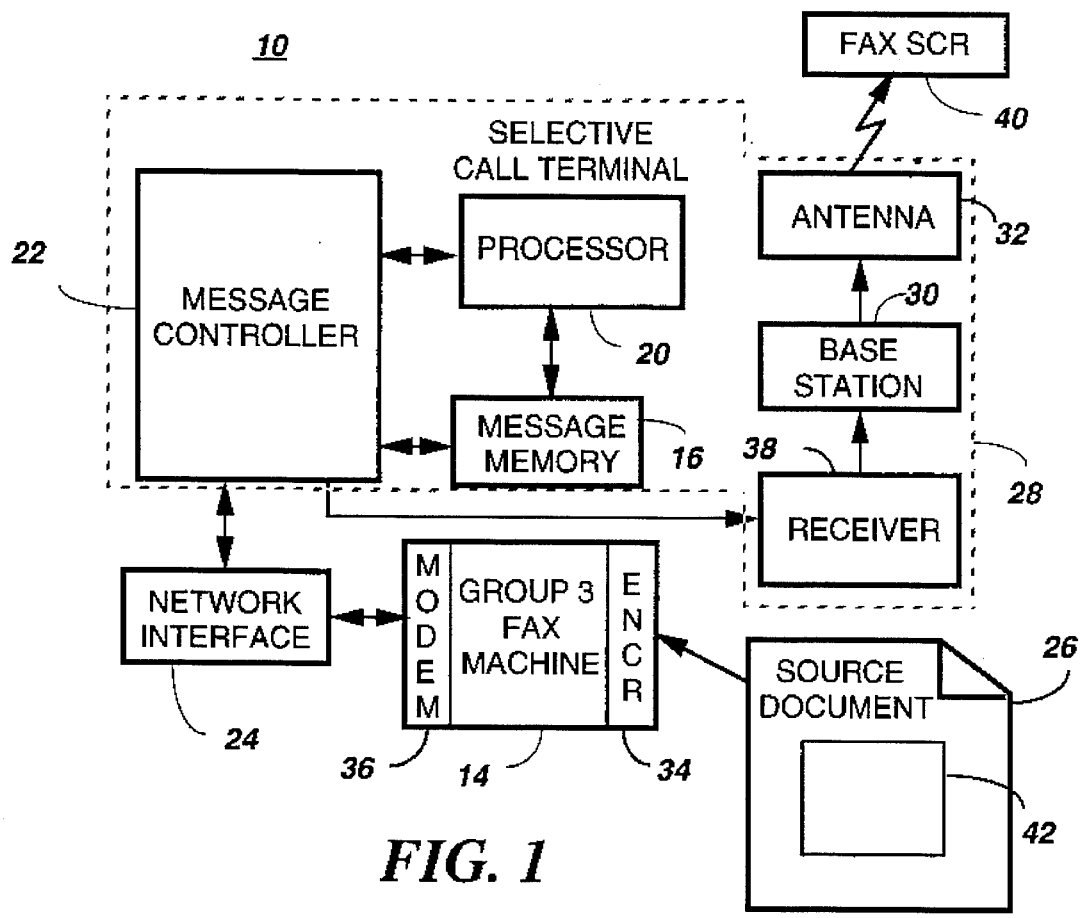
FIG. 1 is an electrical block diagram of a selective call communication system in accordance with the preferred embodiment of the present invention.

Referring to FIG. 1, an electrical block diagram of a selective call communication system 10 is shown in accordance with the preferred embodiment of the present invention. Operationally, a user enters a source document 26 into a facsimile (FAX) machine (scanner) 14. The FAX machine 14 retrieves (or scans) and quantizes the image (message or information) contained thereon. As is well known to one of ordinary skill in the art, the FAX machine comprises an encoder 34 and a modem 36 for encoding the received information and transmitting the received information from the FAX machine 14. Preferably, the information is contained in a predefined information region (information) 42 of the source document 26.

The FAX machine 14 is coupled to a message controller 22 of a selective call terminal 28 via a network interface 24. The network interface 24, well known to one of ordinary skill in the art, can include a Public Switch Telephone Network (PSTN) or an Integrated Service Digital Network (ISDN). It can also be appreciated by one of ordinary skill in the art that the FAX machine 14 can be directly connected to the message controller 22 via a high speed network (e.g., RS-232, IEEE 802.3) to achieve an extremely high speed message throughput. Therefore, the FAX machine 14 needs not be located at the same physical site as the selective call terminal 28. Actually, the FAX machine 14 can be replaced by, for example, a computer, a conventional document scanner, or possibly a dedicated message entry device, each capable of communicating with the message controller 22 via the network interface 24.

To send a FAX to a subscriber (a person or device having a FAX selective call receiver 40), the sender, for example, enters the subscriber's cap-code (address) and other system information and a message in the information region 42 on the source document 26. The sender can send a FAX, by alternatively, calling a subscriber's paging service provider using a conventional telephone to enter, for example, the user's cap-code number (a unique number assigned by the paging service provider that corresponds to the actual coded address of the selective call receiver 40) and other system information. The paging service provider maintains a list of FAX capable cap-code numbers (addresses) and upon receiving the entered cap-code number, a procedure to receive a facsimile message is initiated, the details will be discussed below. The user, according to the preferred embodiment of the present invention, enters the address of the selective call receiver 40 to which the FAX is intended and other system information along with, preferably, a written text message, data or information. Although it is preferred to have a text message, the sender can include a drawing, graphics, or other pictorial information on the source document 26. The source document 26 is then scanned into the FAX machine 14. The processing of the information is encoded and compressed by the encoder 34 of the FAX machine 14 and transferred by the modem 36 via the network interface 24 to the selective call terminal 28 which will produce a paging FAX message that will be transmitted to the targeted subscriber. The method, protocol, and apparatus required for the transmission of the paging message will be discussed in detail below.

After the document has been entered into the FAX machine 14, the entire source document 26 including information contained in the information region 42 is scanned and quantized (retrieved). Thereafter, the information is encoded and compressed by the encoder 34 in the FAX machine preferably according to the Group III FAX coding scheme which is well known to one of ordinary skill in the art. The Group III facsimile (FAX) machine is defined under the CCITT (Consultative Committee on International Telegraph and Telephone). The Group III Facsimile Standards for encoding and compressing data are performed using the coding scheme known as the modified Huffman code. The modified Huffman code uses the standard Huffman code in conjunction with the modified READ (Relative Element Addressing Designate) code. Once the information is Group III encoded and compressed, it is transferred by the modem 36 to the message controller 22 via the PSTN 24. The message controller 22 directs the information to a processor 20 for providing additional processing of the information suitable for selective call communication. After storing at least a portion of the information in a message memory 16, the processor 20 and the message controller 22 begin processing the information before the information is transferred to the subscribers for which it is intended. When the selective call terminal 28 has completed processing the incoming FAX information, a receiver 38 receives the information and a transmitter which comprises a base station 30 and an antenna 32, broadcasts a signal modulated with FAX information representing the selective call address and the information. A selective call receiver 40 is then able to detect its address, recovers the information, alerts the user, and makes the received information available for presentation to the user in a variety of formats including but not limited to ASCII text, characters, graphics and audio. Some specialized applications that can be accommodated by the preferred embodiment of the selective call communication system 10 are electronic mail, storage, retrieval, and forwarding of facsimile messages, and integration of text with graphics into a compound document architecture compatible with industry standard computer productivity software applications.

Figure 2:
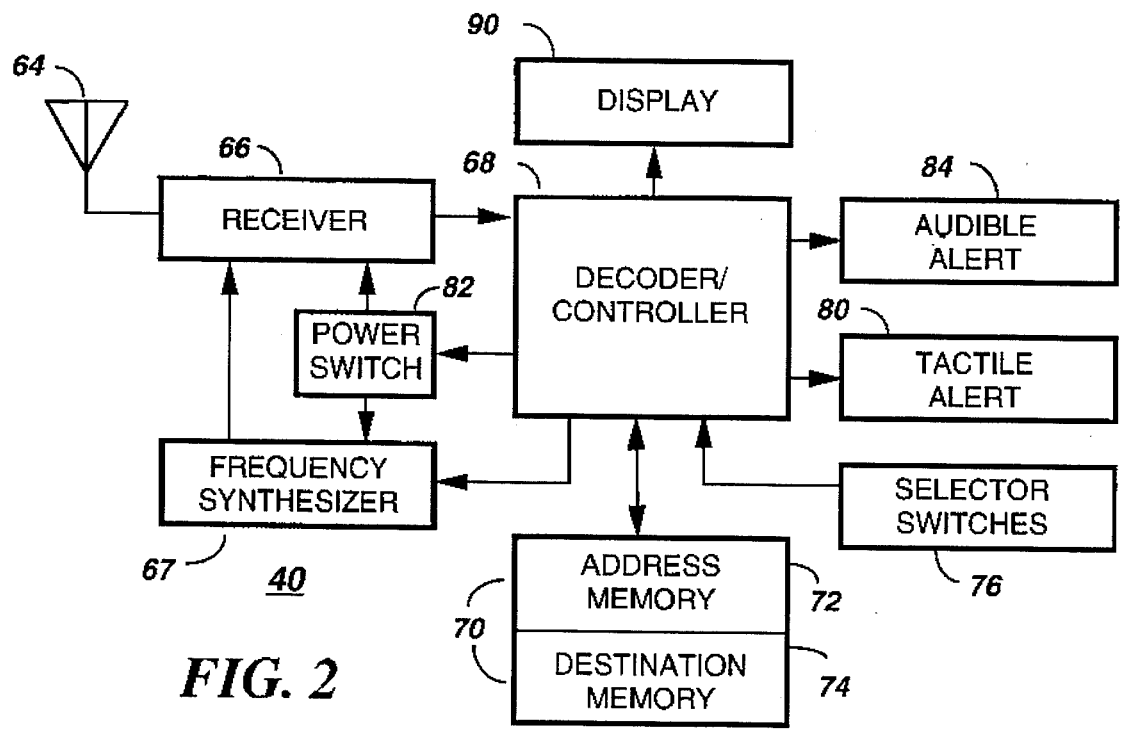
FIG. 2 is an electrical block diagram of a selective call receiver in accordance with the preferred embodiment of the present invention.

Referring to FIG. 2, an electrical block diagram of the selective call receiver 40 is shown in accordance with the preferred embodiment of the present invention. The selective call receiver 40 comprises an antenna 64 for intercepting transmitted radio frequency (RF) signals which is coupled to the input of a receiver 66. The receiver 66 provides for reception of transmissions on a single reception frequency, or, as will be further described below, reception on multiple reception frequencies. When multiple frequency reception is provided, a frequency synthesizer 67 enables the generation of the multiple reception frequencies in a manner well known to one of ordinary skill in the art. The receiver 66 receives and demodulates the transmitted signals, preferably frequency modulated data signals, providing at the output of the receiver a stream of binary data signals corresponding to the destination IDs transmitted from any particular destination location. The binary data signals are coupled into the input of a decoder/controller 68 which processes the signals, in a manner well known in the art. The received destination IDs are compared with the predetermined destination ID corresponding to the destination to which the subscriber has preselected. A memory 70, coupled to the decoder/controller 68, includes a table of destination IDs, or addresses, which are stored in a destination memory 74 section of the memory 70. Selector switches 76 are provided to enable the selection of one or more destination addresses identifying destinations at which the subscriber wishes to be notified. A display 90 is used to display the destination information stored in the destination memory 74 for enabling the subscriber to readily select the destination at which an alert is desired, as will be described below. The decoder/controller 68 compares the received destination IDs with the predetermined destination address selected by the subscriber from the destination memory 74, and when a match is detected, the decoder/controller 68 generates an alert enable signal which is coupled to the input of a sensible alerting device, such as a tactile alerting device 80. The tactile alerting device 80 preferably provides a silent vibratory output alerting the subscriber that the destination selected is being approached.

When the selective call receiver 40 is used to provide both destination notification alerting and paging capability including FAX capability, the addresses assigned to the selective call receiver 40 for use in the selective call communication system are stored in an address memory 72 portion of memory 70. The decoder/controller 68 then controls the generation by the frequency synthesizer 67 of the selective call communication system's frequency or the paging system's frequency, to enable selectively receiving signals on a paging channel or the selective call system channel. A power switch 82 coupled to the decoder/controller 68 is used to control the supply of power to the receiver 66, thereby providing a battery saving function, as is well known in the art for use with selective call receivers. When the paging channel is selected, the received paging address signals are processed by the decoder/controller 68, and when a paging address signal is detected which corresponds to an assigned address of the selective call receiver 40, the decoder/controller 68 generates an alert enable signal which can be coupled to an audible alerting device 84, such as an audible transducer, to provide an audible alert, or can be coupled to the tactile alerting device 80 to provide a silent alert. Selection of either audible or silent alerting is provided by the selector switches 76 in a manner well known in the art.

Figure 3:
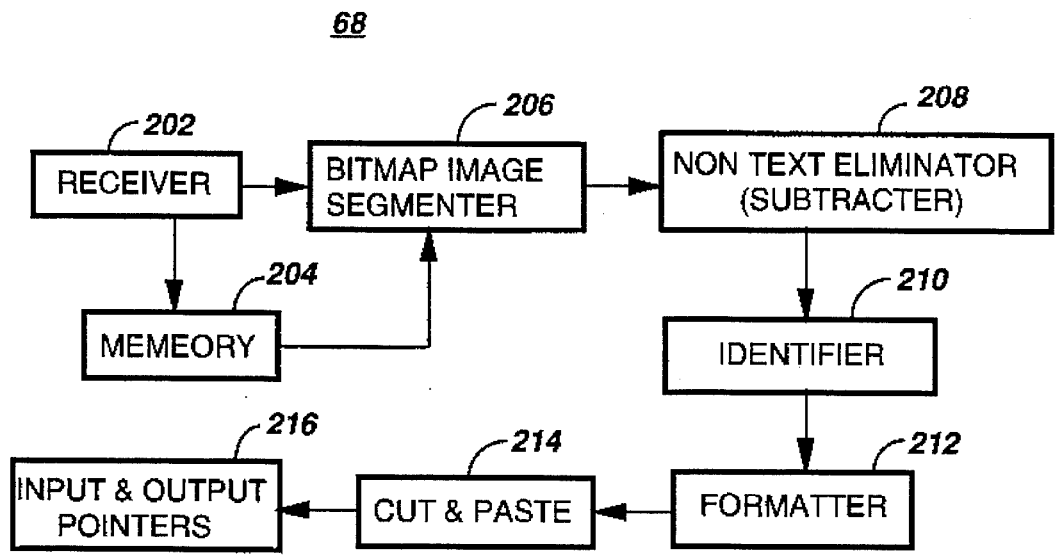
FIG. 3 is an electrical block diagram of a processor/controller of the selective call receiver of FIG. 2 in accordance with the preferred embodiment of the present invention.

Referring to FIG. 3, an electrical block diagram of the decoder/controller of FIG. 2 is shown illustrating a more detailed operation in accordance with the preferred embodiment of the present invention. When the information is received by a receiver 202 of the decoder/controller 68, the information is preferably stored in a memory 204. A bitmap image segmenter 206, coupled to the receiver 202 and the memory 204, can receive the bitmap image of the information (message) from either the receiver 202 or the memory 204. Preferably, the bitmap image is stored in the memory 204, and subsequently thereafter, the bitmap image segmenter 206 accesses the bitmap image and segments the bitmap image into text and non text portions. The technique of segmenting the bitmap image into text and non text image portions can be achieved, for example, by identifying and eliminating (subtracting) all white space border, such as margins, around the text portions being identified. Additionally, when the source document 26 is formatted in multiple columns, the bitmap image segmenter 206 identifies the individual text portions sequentially, and portions of text are thereafter identified as rectangular portions that are bounded by white space borders of some minimum thickness. The segmented bitmap image is transferred to a non text eliminator (or subtracter) 208 which eliminates (or subtracts) the non text portions of the image. A text line identifier 210 identifies lines of the text portion of the bitmap image, and separates the identified lines by determining (or identifying) horizontal scan lines of the bitmap image. The scan lines are identified by locating a first blank and the next blank lines since no scan line within a line can be a completely blank line. A blank line is a line having only white picture elements (pixels). A more robust technique for locating the next line of text comprises establishing a minimum threshold of energy measure and comparing each line with the established threshold, and any line being identified that comprises an energy level less than the minimum threshold is categorized as a blank line.

According to the preferred embodiment of the present invention, the text lines are identified by determining rectangular portions (regions) comprising a text line in the bitmap image. The start of a text line in the bitmap image is determined by locating a transition from an all white (blank) scan line to a scan line having a number of black picture elements (pels) exceeding the minimum threshold measure. The first located scan line denotes the top edge of the rectangle. Similarly, the bottom of the identified scan line is determined by identifying a next scan line which comprises a count of black pels below the minimum threshold measure. The left edge of the rectangular is located preferably as the column with the first black pel, and the right edge is located as the column with the last black pel in the region bounded by the identified top and bottom of the rectangular portion of the bitmap image.

A text line formatter 212, coupled to the text line identifier 210, formats the rectangular regions that comprise the identified lines of text of the bitmap image to the width of the output display screen. The formatting, preferably, comprises a cut-and-paste operators 214 using pointers for designating inputs and outputs devices (or designators) 216. For example, the input pointer is initially placed by the left edge of an identified scan line of the rectangular portion of the bitmap image of the text. An output pointer also is placed at the left edge of the output screen. Before, the information is displayed on the display screen, the rectangular regions (or subregions) are checked to determine the number of pixels that can be displayed in a single line on the output display screen. The input and output pointers 216 are advanced by the number of determined pixels, the number of pixels advanced by the pointers determine a display line on the output display screen 90. Preferably, to avoid any unconventional divisional of words that are included in the scan lines once a display line is determined, the output and the input pointers 216 are reversed a number of pixels until a blank space is located. This reversal is performed when the end-of-the-display-line is not a followed by a blank space. The procedure is repeated until the end of the rectangle is reached, and the process of determining a blank space to establish the end-of-each-display line determines the length of the text lines by a step of "wrapping" the text lines. The step of wrapping further includes the step of terminating each text line with a blank space (or a white pixel).

In this way, the selective call receiver 40 receives FAX information in a bitmap representation and formats the FAXed information to enable the information to be displayed on the miniature display screen of the selective call receiver irrespective of the format of the FAXed information. Furthermore, the selective call receiver processes the bitmap representation of the information to eliminate the need for character recognition algorithms which require large amount of memory and processing power. The memory and processing power requirement make character recognition algorithms unsuitable or undesirable for low power devices such as selective call receivers. Consequently, the formatting feature of the selective call receiver cause the FAXed information to be elegantly displayed on the display screen thereby eliminating panning by the user to traverse the entire information that is being presented.

Figure 4:
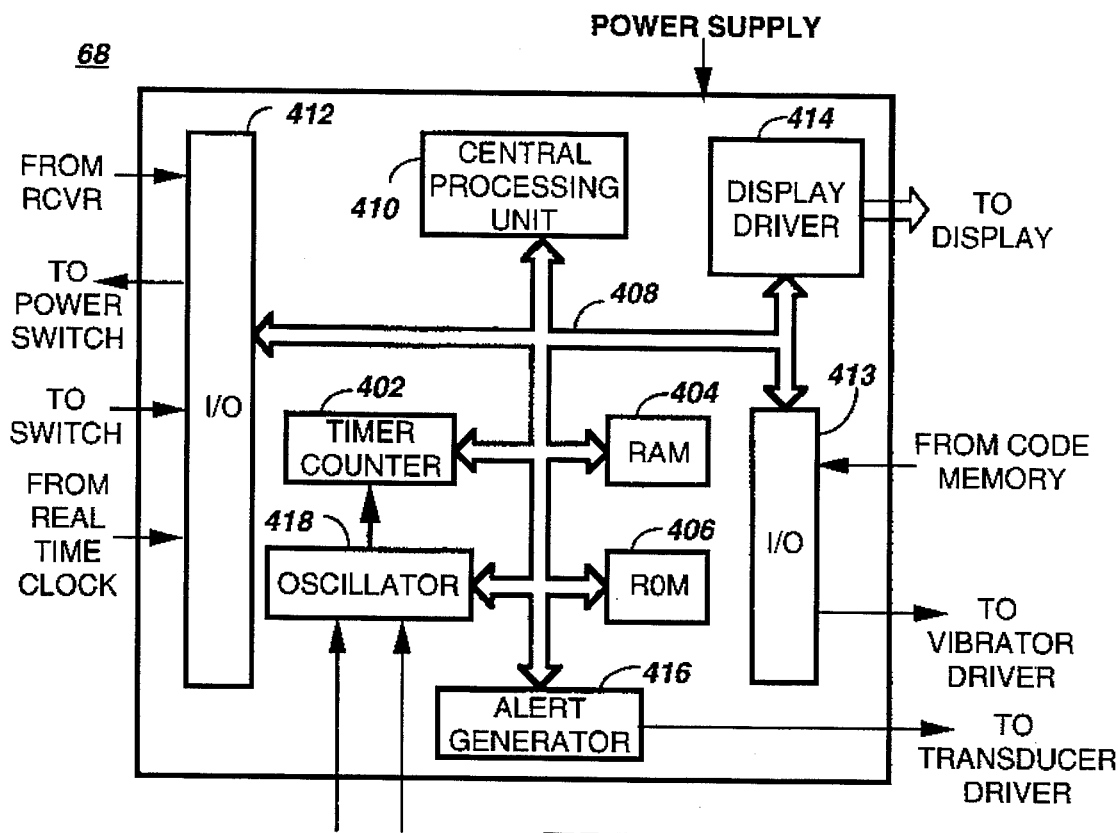
FIG. 4 is an electrical block diagram of a microcomputer based decoder/controller used in the selective call receiver of FIG. 2.

The controller/decoder 68 of FIG. 2 can be implemented utilizing a microcomputer as shown in FIG. 4. FIG. 4 is an electrical block diagram of a microcomputer based decoder/controller suitable for use in the selective call receiver of FIG. 2. As shown, the microcomputer 68 is preferably of the family of MC68HC05 series microcomputers, such as manufactured by Motorola, Inc., which includes an on-board display driver 414. The microcomputer 68 includes an oscillator 418 which generates the timing signals utilized in the operation of the microcomputer 68. A crystal, or crystal oscillator (not shown) is coupled to the inputs of the oscillator 418 to provide a reference signal for establishing the microcomputer timing. A timer/counter 402 couples to the oscillator 418 and provides programmable timing functions which are utilized in controlling the operation of the receiver or the processor. A RAM (random access memory) 404 is utilized to store variables derived during processing, as well as to provide storage of FAX or paging information which are received during operation as a selective call receiver. A ROM (read only memory) 406 stores the subroutines which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory). The oscillator 418, timer/counter 402, RAM 404, and ROM 406 are coupled through an address/data/control bus 408 to a central processing unit (CPU) 410 which performs the instructions and controls the operations of the microcomputer 68.

The demodulated data generated by the receiver is coupled into the microcomputer 68 through an input/output (I/O) port 412. The demodulated data is processed by the CPU 410 and when the received address is the same as that stored within the code-plug memory which couples into the microcomputer through, for example an I/O port 413, the selective call FAX message is received and stored in RAM 404. Recovery of the stored message, and selection of the predetermined destination address, is provided by the switches which are coupled to the I/O port 412. The microcomputer 68 then recovers the stored message and directs the information over the data bus 408 to the display driver 414 which processes the information and formats the information for presentation by the display (output display screen) 90 (FIG. 2) such as an LCD (liquid crystal display). It can be appreciated by one of ordinary skill in the art that the display 90 on the selective call receiver 40 is substantially smaller than a computer screen. This difference in size, for example, requires the source document 26 to be partitioned into the information region 42 for receiving the user's text and graphic information. The formatting feature of the selective call receiver causes the FAXed information to be elegantly displayed on the display screen thereby eliminating panning to enable the user to traverse the entire information that is being presented. When the selective call receiver 40 receives its address, the alert signal that is generated can be routed through the data bus 408 to an alert generator 416 that generates the alert enable signal which is coupled to the audible alert device that was described above. Alternatively, when the vibrator alert is selected, as described above, the microcomputer generates an alert enable signal which is coupled through data bus 408 to the I/O port 413 to enable generation of a vibratory, or silent alert.

The battery saver operation is controlled by the CPU 410. The battery saving signals are directed over the data bus 408 to the I/O port 412 which couples to the power switch 82 (FIG. 3). Power is periodically supplied to the receiver to enable decoding of the received selective call receiver address signals and the selective call composite FAX information which is directed to the selective call receiver 40. The composite information, preferably comprise the selective call FAX text and graphic information, is stored and ready to be displayed on the display 90.

Figure 5:
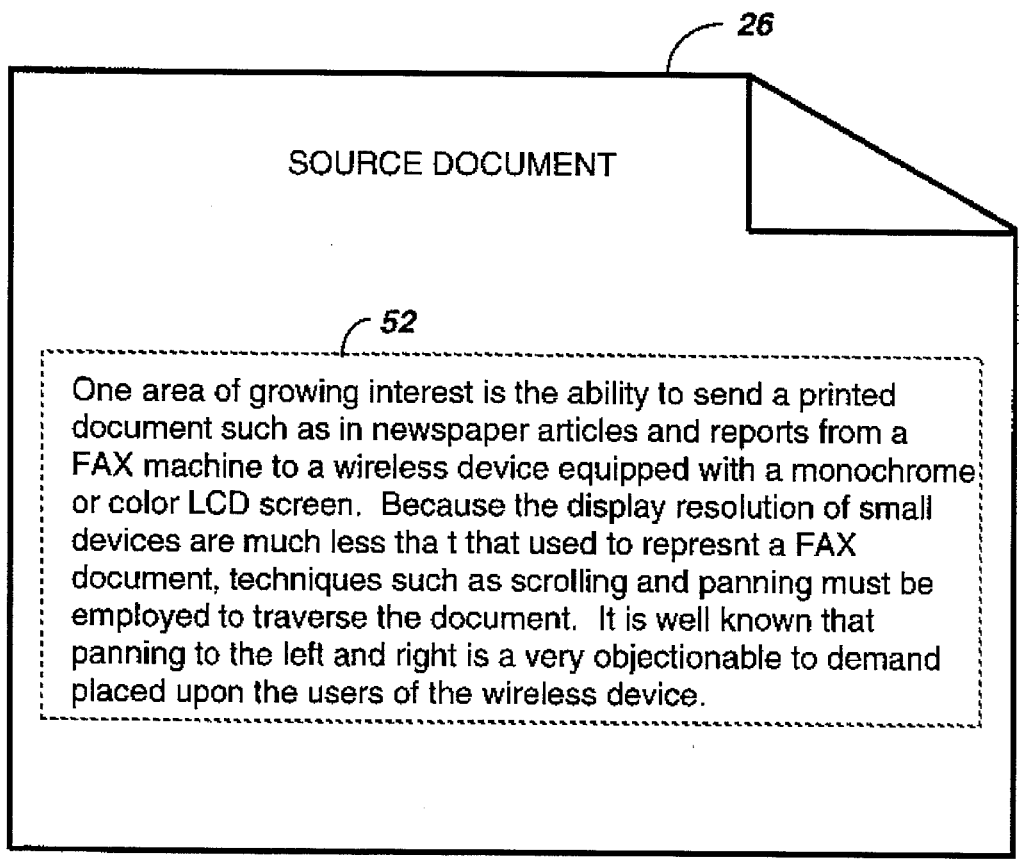
FIG. 5 illustrates a source document according to the preferred embodiment of the present invention.

Referring to FIG. 5, an illustration of the source document is shown in accordance with the preferred embodiment of the present invention. The source document 26 shows the message as entered on the source document 26. The message (or information) 52, according to the preferred embodiment of the invention, is contained (or entered) for example on a typically eight-and-one-half-inch by eleven-inch (approximately 21.25 cm by 27.5 cm) paper which is scanned into the FAX machine 14. However, if the message is processed and displayed in the original format as received by the FAX machine, the message would be too large (length and width) for the display of the selective call receiver 40. Therefore, with this invention, the message after being processed and transmitted by the selective call terminal 28, the selective call receiver 40 receiving the message, among other things, processes the bitmap representation of the message to reformat the message thereby eliminating the need for panning by the user of the selective call receiver 40 to read or traverse the message. Also, by providing for the reformatting at the selective call receiver 40, the selective call receiver 40 can reformat the message precisely for its display 90 because each selective call receiver 40 knows the parameter of its display 90.

Figure 6:
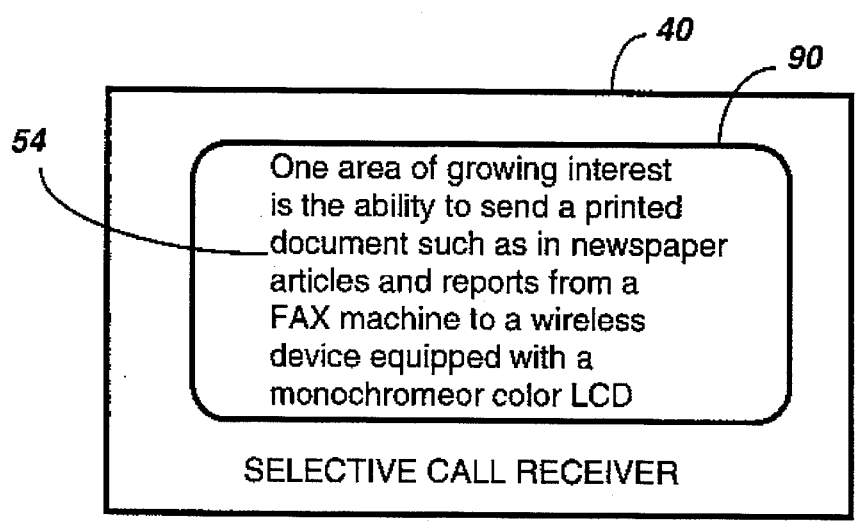
FIG. 6 is a block diagram illustrating the displaying of information with the selective call receiver in accordance with the preferred embodiment of the present invention.

FIG. 6 illustrates the reformatted information being displayed on the display 90 of the selective call receiver 40. As is well known, the display 90 of the selective call receiver 40 is much smaller than the source document 26, for example a typical size of paper. As shown, after processing the bitmap representation of the information, the information is reformatted to fit elegantly within the parameters of the display thereby eliminating the need for panning. The reformatted information 54 which is shown in text form depicts information in the bitmap format or representation. The selective call receiver 40 processes and reformats the information in the bitmap representation and not as character variable. Although the information 54 shown is English characters, it can be appreciated by one of ordinary skill in the art that any other character or ideographic character representation is equally applicable. In this way, the selective call receiver 40 eliminates the need for storing a large amount of data or information in a look up table to compare each character that is capable of being received. By eliminating the need for look-up tables, the selective call receiver 40 is able to store more information (message) in its memory, a feature which is highly desirable by the user of the selective call receiver 40. The information that is reformatted is wrapped to illustrate that the user has no need for panning to retrieve the information being presented because the information is formatted to elegantly fit the display screen of the selective call receiver. The wrapped text line further includes the step of terminating each text line with a blank space (or a white pixel).

The advantage of this invention provides a fast processing algorithms in a selective call receiver that receives FAX information in a bitmap representation and formats the FAXed information to enable the information to be displayed on the miniature display 90 of the selective call receiver irrespective of the format of the FAXed information. Furthermore, the selective call receiver processes the bitmap representation of the information to eliminate the need for character recognition algorithms which require large amount of memory and processing power. The memory and processing power requirement make character recognition algorithms unsuitable or undesirable for low power devices such as selective call receivers. Consequently, the formatting feature of the selective call receiver cause the FAXed information to be elegantly displayed on the display screen thereby eliminating panning by the user to traverse the entire information that is being presented.

Figure 7:
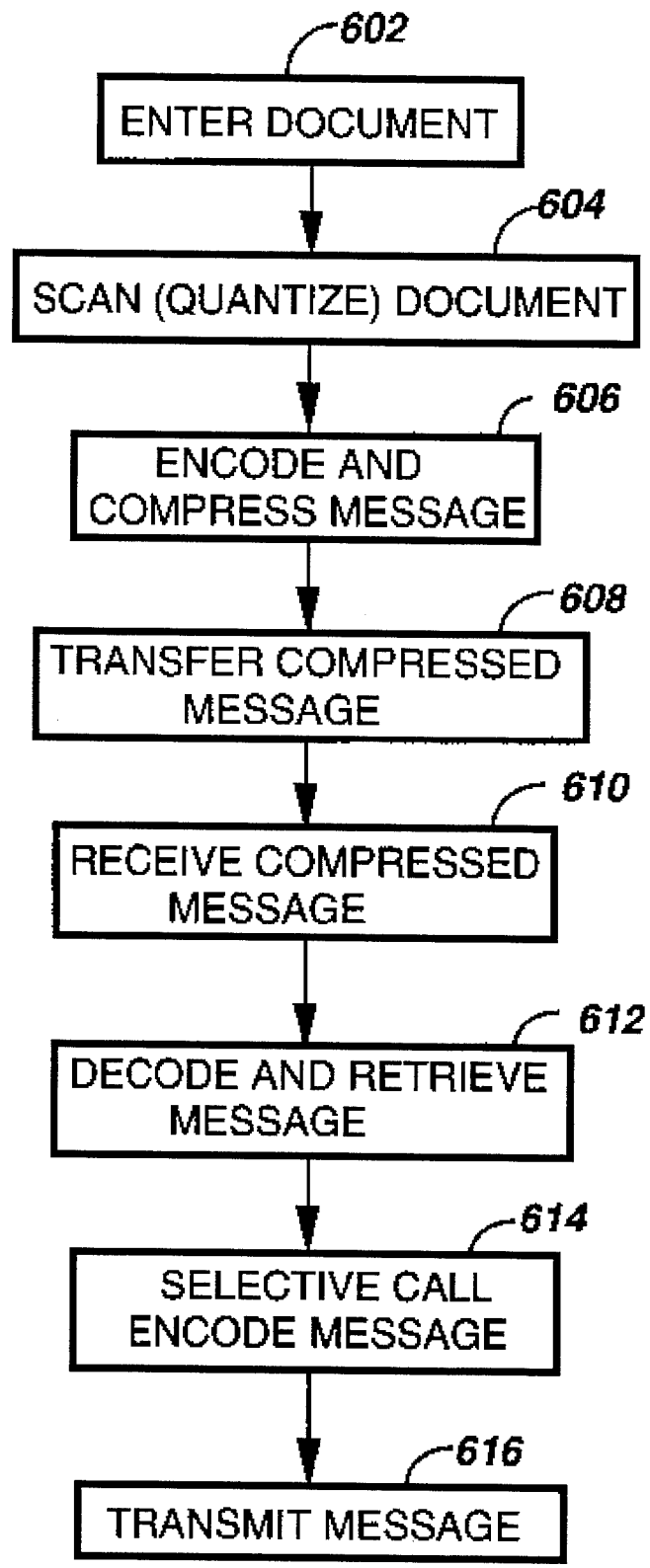
FIG. 7 is a flow diagram illustrating the operation of the selective call terminal in accordance with the preferred embodiment of the present invention.

Referring to FIG. 7, a flow diagram is shown illustrating facsimile communication in accordance with the preferred embodiment of the present invention. When the source document 26 has been entered, step 602, the FAX machine 14 scans and quantizes the information on the source document 26, step 604. The quantized information is then encoded and compressed, preferably according to the Group III facsimile standard, step 606. The encoded and compressed information is transferred from the FAX machine 14 to the message controller 22 via the PSTN 24, step 608. The message controller 22 receives the compressed information and stores it in memory to be accessed by the processor 20 which processes the compressed information before transmission to its designated selective call receiver 40, step 610. The received information is then decoded from the Group 3 format to retrieve the information, step 612. The information is processed further to selective call encode the information, step 614. In the selective call encoding step, the information is encoded with the address of the at least one selective call receiver 40 which the information is intended. The message is then transmitted to the at least one selective call receiver, step 616.

Figure 8:
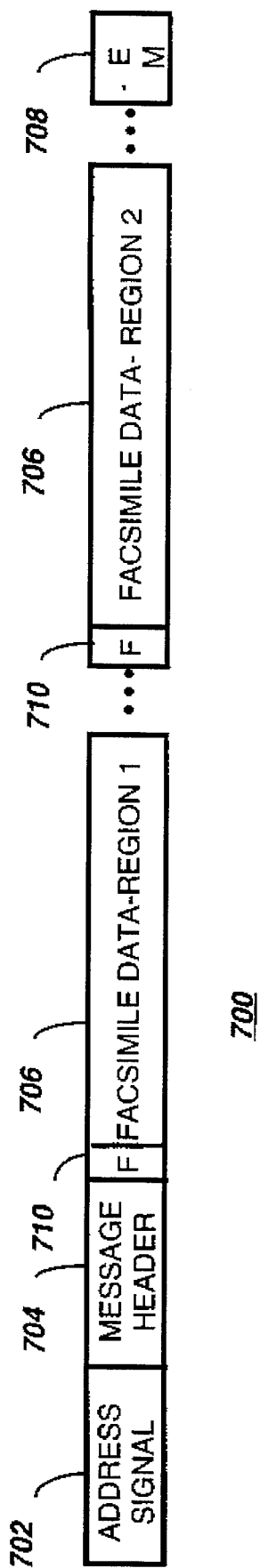
FIG. 8 is a protocol diagram of a selective call information signaling format in accordance with the preferred embodiment of the present invention.

Referring to FIG. 8, a protocol diagram of a selective call communication format is shown in accordance with the preferred embodiment of the present invention. The signaling protocol is used for addressing and transmitting facsimile information to the selective call receiver 40 using any facsimile standard. A FAX paging information packet 700 comprises a selective call address 702, a facsimile message header 704, format or message type identifier 710, data blocks 706 encoded in Group III facsimile data, and an end-of-message flag 708. The end-of-message flag 708 can be omitted without compromising the integrity of this signaling format. The address signal 702 comprises a conventional selective call address of a type that is well known to one of ordinary skill in the art. The message header 704 contains information on the data block length, FAX protocol type, a data flag to determine if a FAX or a regular paging message is being received and possibly an encryption type for use in a secure FAX messaging system. Following the message header 704 is the format identifier 710 which identifies whether the following information is ASCII text or bit-map graphic image. Following the format identifier 710 is the data block 706 containing standard facsimile data of the format or type indicated by the format identifier. This embodiment can be used in conjunction with a conventional FAX machine to receive FAX messages via a wireless data channel. Furthermore, when used in conjunction with a personal computer or the like (e.g., a laptop computer), the selective call receiver 40 as illustrated in FIG. 2 can couple the received FAX message data to the computer for storage in a file, thus allowing the user to have an archive of the received FAX messages. Since the received FAX message data is unaltered from its native transmission format, conventional facsimile data manipulation hardware and software can be used to obtain a hardcopy of the received FAX.

Figure 9:
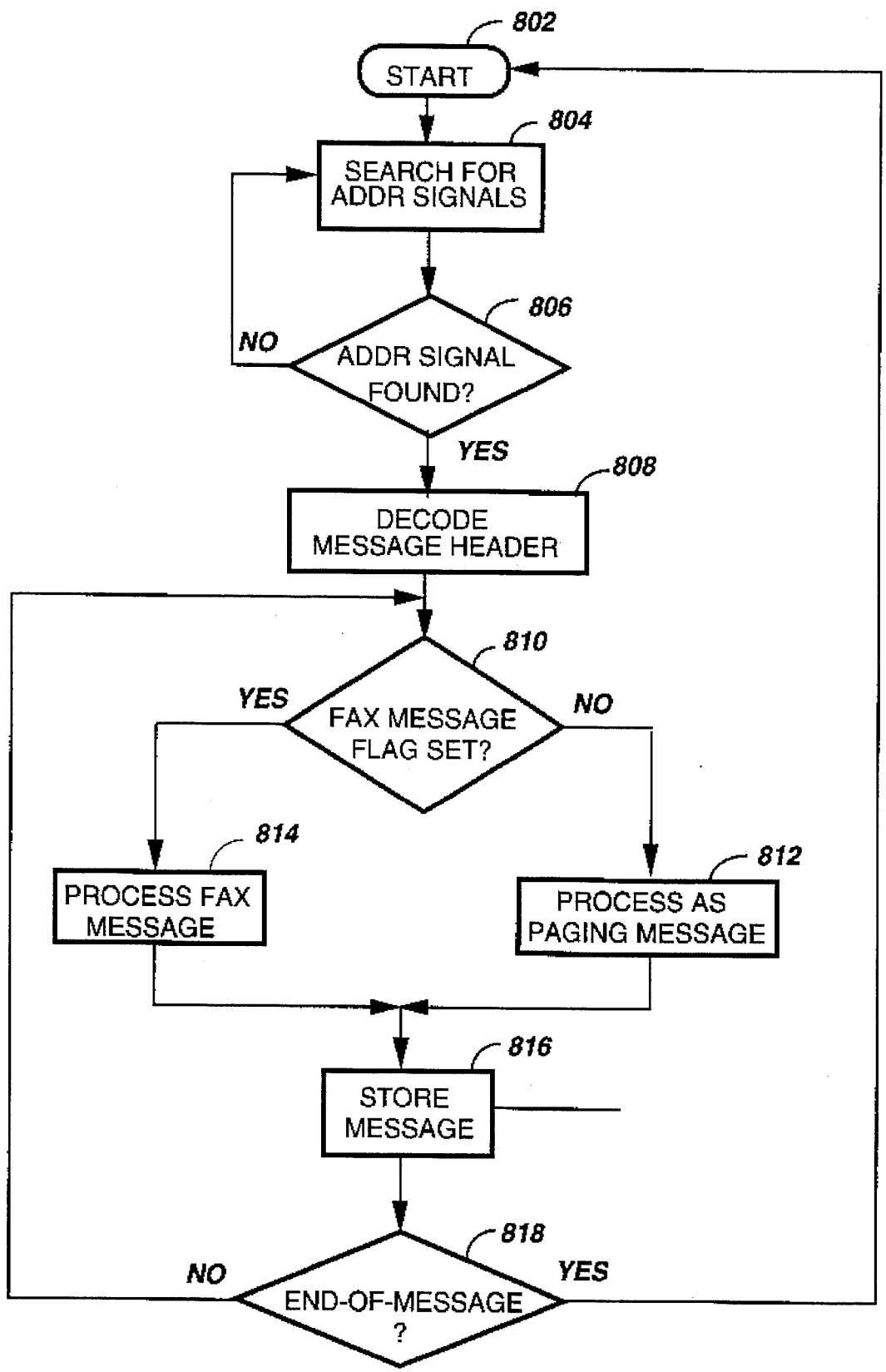
FIG. 9 is a flow diagram illustrating the operation of the selective call receiver in FIG. 2.

Referring to FIG. 9, the flow diagram illustrates the receiving operation of the selective call receiver of FIG. 2. The process of receiving a selective call message begins at step 802. In step 804, the address decoder searches a received signal for an address signal. Step 806 tests any recovered address signals to determine if they correlate with at least one predetermined address associated with the selective call receiver 40. If the received address does not correlate (match), control is returned to step 804 and a new search is performed. When a received address correlates with at least one predetermined address associated with the selective call receiver, step 808 decodes the message header then passes control to step 810. Step 810 tests for the presence of a FAX data flag. If step 810 is false, the following data block will contain symbols that will be decoded as a conventional paging message, step 812. When decoding is complete, step 816 stores the data and step 818 tests for an end of message condition which may be indicated by an end-of-message marker or the lack of another data flag. If step 818 is false (not yet at end of message) and step 810 is true, the following data block will contain a FAX message. The FAX message is decoded, the details to be discussed below, step 814, and stored, step 816. When step 818 is true, control is returned to step 802 and the address decoder resumes searching for valid addresses.

Figure 10:
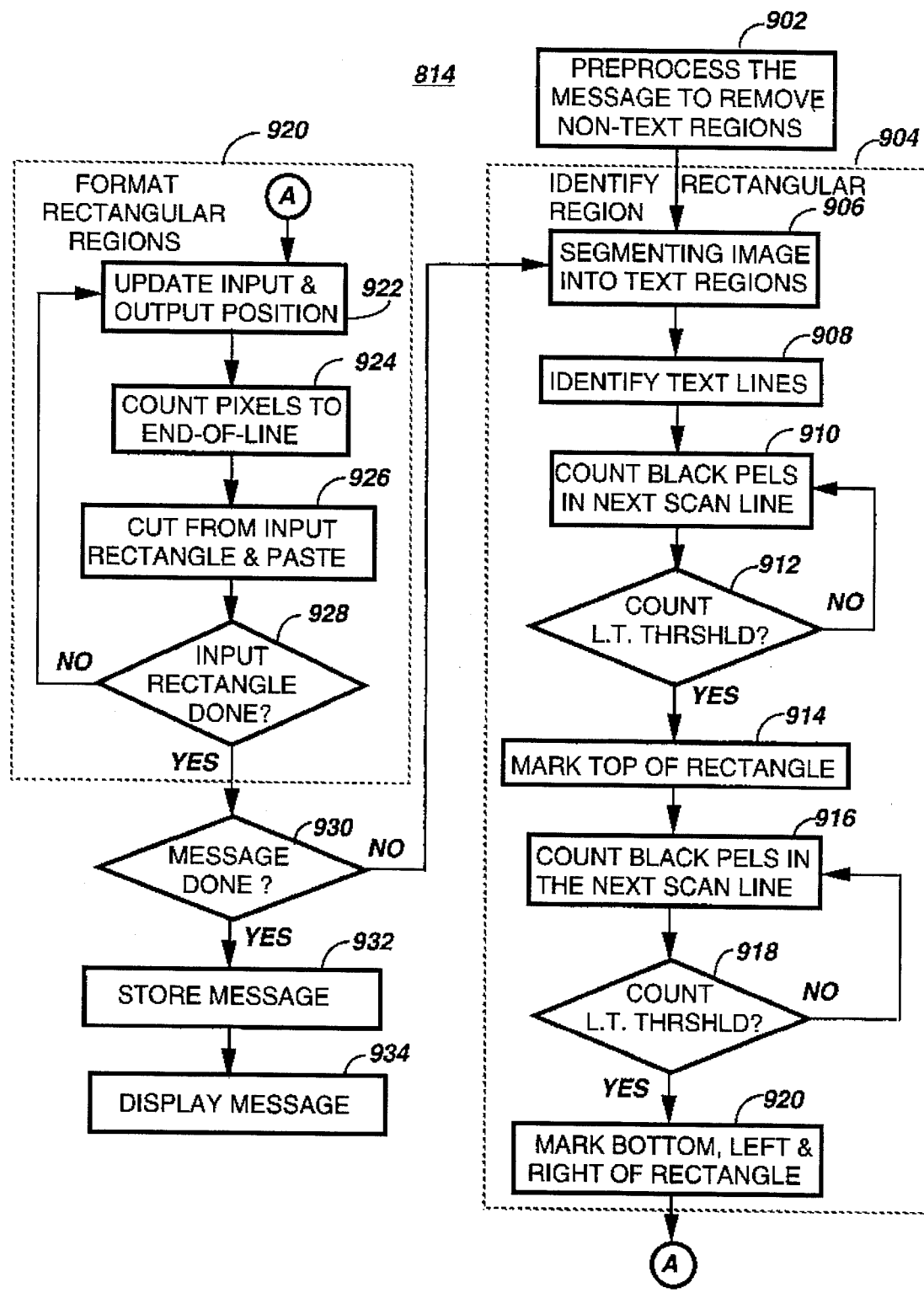
FIG. 10 is a flow diagram illustrating the detail operation of the selective call receiver in FIG. 2 in accordance with the preferred embodiment of the present invention.

Referring to FIG. 10, a flow diagram is shown illustrating the detailed operation of the selective call receiver in FIG. 2 in accordance with the preferred embodiment of the present invention. The processing of the FAX message 814 (FIG. 9) begins with the selective call receiver 40 preprocessing the information to remove non-text regions by techniques well known to one skilled in the art, step 902. The rectangular regions are identified in step 904. The step of identifying the rectangular regions 904 further comprises the step of segmenting the bitmap image into text regions, step 906. The technique of segmenting the bitmap image into text and non text image portions can be achieved, for example, by identifying and eliminating all white space border, such as margins, around the text portions being identified. Additionally, when the source document 26 is formatted in multiple columns, the step of segmenting identifies the individual text portions sequentially, and portions of text are thereafter identified as rectangular portions that are bounded by white space borders of some minimum thickness. The segmented bitmap image is further processed to eliminate (or subtract) the non text portions of the image. Step 908 identifies lines of the text portion in the bitmap image, and separates the identified lines by determining (or identifying) horizontal scan lines of the bitmap image. The scan lines are identified by locating a first blank and the next blank lines since no scan line within a line can be a completely blank line. Blank lines are lines having only white picture elements (pixels). A more robust technique for locating the next line of text comprises the step of establishing a minimum threshold of energy measure and comparing each line with the established threshold. To obtain the energy content of each line, step 910 counts the number of black picture elements (pels) in the each scan lines, and, in step 912, the energy content of the scan line is compared with the established threshold. If the energy content is not less than the established threshold, the process returns to step 910 to measure the energy content of the next scan line. Any identified line that comprises an energy level less than the minimum threshold is categorized as a blank line. On the other hand, when the energy content of the scan line is less than the established threshold, step 912, the start of the scan line is determined by marking (or identifying) the top of the rectangular, step 914.

The process of identifying the rectangular region continues after marking the top of the rectangle, by counting the number of black pels in the next scan line to determine the energy measure (level) of the scan line, step 916. In step 918, the energy measure of the scan line is compared with the established threshold. When the energy content is not less than the established threshold, the process continues to step 916 to determine the energy content of the next scan line. Alternatively, when the energy content is less than the established threshold, step 920 marks the bottom, left, and right of the rectangular regions. The left edge of the rectangular is located preferably as the column with the first black pel, and the right edge is located as the column with the last black pel in the region bounded by the identified top and bottom of the rectangular portion of the bitmap image. In this way, the rectangular region is determined by marking the positions of blank lines at the top, bottom, left, and right of the bitmap image to constitute the rectangular region.

After identifying the rectangular regions, the selective call receiver begins to format (or reformats) the rectangular regions that were identified, step 920. The formatting of the rectangular regions comprises updating the input and output positions of input and output pointers, step 922. The updating of the input and the output pointers includes initializing the pointers during the initialization of the formatting process. For example, the input pointer is initially placed by the left edge of an identified scan line of the rectangular portion of the bitmap image. The output pointer also is placed at the left edge of the output screen. Before, the information is displayed on the display screen, the rectangular regions (or subregions) are checked to determine the number of pixels that can be displayed in a single line on the output display screen, step 924. Preferably, the number of pixels are determined to establish where an end-of-line deliminator is to be inserted. The input and output pointers are advanced by the number of determined pixels, the number of pixels advanced by the pointers determine a display line on the output display screen. The formatting, preferably, comprises a cut-and-paste operation using pointers for designating inputs and outputs devices (or designators), step 926. The input rectangle is checked to determine if the processing thereof is completed, step 928. If not, the process returns to step 922 to update the input and output pointers for formatting the next line of text. Alternatively, when the input rectangle is done, step 928, step 930 checks to determine if the message or information is completely processed. If not, the process continues to step 906 where the segmenting of the bitmap image is performed. Otherwise, when the message is completely processed, step 930, the reformatted message or information is stored, step 932. In step 932, the stored message is displayed.

Preferably, to avoid any unconventional divisional of words that are included in the scan lines once a display line is determined, the output and the input pointers are reversed a number of pixels until a blank spaced is located. This reversal is performed when the end-of-the-display-line is not a followed by a blank space. The procedure is repeated until the end of the rectangle is reached, and the process of determining a blank space to establish the end-of-each-display line determines the length of the text lines by a step of "wrapping" the text lines. The step of wrapping further includes the step of terminating each text line with a blank space (or a white pixel).

In this way, the selective call receiver receives FAX information in a bitmap representation and formats the FAXed information to enable the information to be displayed on the miniature display screen of the selective call receiver irrespective of the format of the FAXed information. Furthermore, the selective call receiver processes the bitmap representation of the information to eliminate the need for character recognition algorithms which require large amount of memory and processing power. The memory and processing power requirement make character recognition algorithms unsuitable or undesirable for low power devices such as selective call receivers. Consequently, the formatting feature of the selective call receiver cause the FAXed information to be elegantly displayed on the display screen thereby eliminating panning by the user to traverse the entire information that is being presented.

In summary, the preferred embodiment of the present invention comprises, in a selective call communication system, a method of facsimile communication, comprises the steps of: (a) retrieving information from a source document; (b) encoding and compressing the information; (c) transferring the information to a selective call terminal; (d) receiving the information at the selective call terminal; (e) processing the information in the selective call terminal; and (f) transmitting the information as a bitmap image which is received by an at least one selective call receiver. In the at least one selective call receiver, a method comprises the steps of: (g) processing the bitmap image. The step of processing further comprises the steps of: (h) segmenting the bitmap image into a text region and a non text region; (i) subtracting the non text region from the bitmap image; and (j) identifying rectangular regions within the text region. The step of identifying rectangular regions further comprises the steps of: (k) establishing a threshold energy measure; (l) counting black pixels; (m) formatting the rectangular regions into text lines. The step formatting further comprises the steps of: (m1) designating an input pointer and an output pointer; (m2) comparing the black pixels with the threshold energy measure; and (m3) wrapping the text lines having a number of black pixels greater than the threshold energy measure; and (n) displaying the text lines being formatted.

According to the invention, when the information is decoded and formatted, the information elegantly fits within the constraints of the selective call receiver without seriously degrading battery life or battery saving features.

What is claimed is:

1. In a selective call communication system, a method of facsimile communication, comprising the steps of:

(a) retrieving information from a source document;

(b) encoding and compressing the information;

(c) transferring the information to a selective call terminal;

(d) receiving the information at the selective call terminal;

(e) processing the information in the selective call terminal; and (f) transmitting the information as a bitmap image in a first format which is received by an at least one selective call receiver, in the at least one selective call receiver, a method comprising the steps of:

(g) segmenting the bitmap image into a text region and a non text region;

(h) subtracting the non text region from the bitmap image;

(i) identifying text lines within the text region of the bitmap image;

(j) reformatting the bitmap image to a second format by wrapping the text lines of the bitmap image having a number of black pixels greater than a threshold energy measure; and (k) displaying the text lines being formatted.

2. The method according to claim 1 wherein the least one selective call receiver further comprising a step of processing the bitmap image.

3. The method according to claim 2 wherein said step of processing the bitmap image further comprising a step of identifying rectangular regions within the bitmap image.

4. The method according to claim 3 wherein said step of identifying rectangular regions further comprising the steps of:

establishing the threshold energy measure; and counting black pixels of the text lines.

5. The method according to claim 1 wherein said step of reformatting further comprising the steps of:

designating an input pointer and an output pointer;

establishing a threshold energy measure;

counting black pixels in the text lines; and comparing the black pixels with the threshold energy measure.

6. The method according to claim 5 wherein the step of wrapping further comprising a step of terminating each text line with a white pixel.

7. In a selective call receiver, a method for facsimile communication comprising the steps of:

(a) receiving information in a first format comprising a bitmap image;

(b) determining when the information being received comprises facsimile information;

(c) segmenting the bitmap image into a text region and a non text region in response to step (b);

(d) subtracting the non text region from the bitmap image;

(e) identifying text lines within the text region of the bitmap image;

(f) reformatting the bitmap image to a second format by wrapping the text lines of the bitmap image having a number of black pixels greater than a threshold energy measure; and (g) displaying the text lines being formatted.

8. The method according to claim 7 wherein the selective call receiver further comprising a step of processing the bitmap image.

9. The method according to claim 8 wherein said step of processing further comprising a step of identifying rectangular regions within the bitmap image.

10. The method according to claim 9 wherein said step of identifying rectangular regions further comprising the steps of:

establishing the threshold energy measure; and counting black pixels of the text lines.

11. The method according to claim 7 wherein said step of reformatting further comprising the steps of:

designating an input pointer and an output pointer;

establishing a threshold energy measure;

counting black pixels in the text lines; and comparing the black pixels with the threshold energy measure.

12. The method according to claim 11 wherein the step of wrapping further comprising a step of terminating each text line with a white pixel.

13. A selective call communication system, comprising:

a scanner for retrieving information from a source document; the scanner further comprising:

an encoder for encoding and compressing the information; and a modem, coupled to said encoder, for transferring the information to a selective call terminal; the selective call terminal, comprising:

a receiver for receiving the information;

a processor, coupled to said receiver, for processing the information a transmitter, coupled to the processor, for transmitting the information which is received as a bitmap image in a first format by an at least one selective call receiver, the at least one selective call receiver comprising:

a segmenter for segmenting the bitmap image into a text region and a non text region;

a subtracter, coupled to the segmenter, for subtracting the non text region from the bitmap image;

an identifier, coupled to the subtracter, for identifying text lines within the text region of the bitmap image;

a formatter, coupled to the identifier, for reformatting the text lines of the bitmap image to a second format, the formatter further comprises means for wrapping which reformats the text lines to the second format having a number of black pixels greater than a threshold energy measure; and a display, coupled to the formatter, for displaying the text lines being formatted.

14. The selective call communication system according to claim 13 wherein the least one selective call receiver further comprising a selective call processor for processing the bitmap image.

15. The selective call communication system according to claim 14 wherein the selective call processor further comprising a rectangular identifier for identifying rectangular regions within the bitmap image.

16. The selective call communication system according to claim 15 wherein the rectangular identifier further comprising:

means for establishing a threshold energy measure; and a counter, coupled to the means for establishing, for counting black pixels of the text lines.

17. The selective call communication system according to claim 13 wherein the formatter further comprising:

means for designating an input pointer and an output pointer;

means, coupled to the means for designating, for establishing a threshold energy measure;

a counter, coupled to the means for establishing, for counting black pixels in the text lines; and a comparator, coupled to the counter, for comparing the black pixels with the threshold energy measure.

18. The selective call communication system according to claim 17 wherein the means for wrapping further comprising means for terminating each text line with a white pixel.

19. A selective call receiver, comprising:

a receiver for receiving information in a first format comprising a bitmap image;

a segmenter, coupled to the receiver, for segmenting the bitmap image into a text region and a non text region;

a subtracter, coupled to the segmenter, for subtracting the non text region from the bitmap image;

an identifier, coupled to the subtracter, for identifying text lines within the text region of the bitmap image;

a formatter, coupled to the identifier, for reformatting the text lines of the bitmap image to a second format, the formatter further comprises means for wrapping which reformats the text lines to the second format having a number of black pixels greater than a threshold energy measure; and a display, coupled to the formatter, for displaying the text lines being formatted.

20. The selective call receiver according to claim 19 further comprising a processor for processing the bitmap image.

21. The selective call receiver according to claim 20 wherein the processor further comprising a rectangular identifier for identifying rectangular regions within the bitmap image.

22. The selective call receiver according to claim 21 wherein the rectangular identifier further comprising:

means for establishing a threshold energy measure; and a counter, coupled to the means for establishing, for counting black pixels of the text lines.

23. The selective call receiver according to claim 19 wherein the reformatter further comprising:

means for designating an input pointer and an output pointer;

means, coupled to the means for designating, for establishing a threshold energy measure;

a counter, coupled to the means for establishing, for counting black pixels in the text lines; and a comparator, coupled to the counter, for comparing the black pixels with the threshold energy measure.

24. The selective call receiver according to claim 23 wherein the means for wrapping further comprising means for terminating each text line with a white pixel.

25. In a selective call communication system, a method of facsimile communication, comprising the steps of:

(a) retrieving information from a source document;

(b) encoding and compressing the information;

(c) transferring the information to a selective call terminal;

(d) receiving the information at the selective call terminal;

(e) processing the information in the selective call terminal; and (f) transmitting the information as a bitmap image in a first format which is received by an at least one selective call receiver, in the at least one selective call receiver, a method comprising the steps of:

(g) processing the bitmap image, the step of processing further comprising:

(h) segmenting the bitmap image into a text region and a non text region;

(i) subtracting the non text region from the bitmap image; and (j) identifying rectangular regions within the text region, the step of identifying rectangular regions further comprising the steps of:

(k) establishing a threshold energy measure;

(l) counting black pixels;

(m) reformatting the bitmap image Of the rectangular regions into a second format as text lines, the step reformatting further comprising the steps of:

(m1) designating an input pointer and an output pointer;

(m2) comparing the black pixels with the threshold energy measure; and (m3) wrapping the text lines having a number of black pixels greater than the threshold energy measure; and (n) displaying the text lines being formatted.

26. In a selective call receiver, a method for facsimile communication comprising the steps of:

(a) receiving information comprising a first format of a bitmap image;

(b) determining when the information being received comprises facsimile information;

(c) processing the bitmap image, the step of processing further comprising;

(d) segmenting the bitmap image into a text region and a non text region;

(e) subtracting the non text region from the bitmap image; and (f) identifying rectangular regions within the text region, the step of identifying rectangular regions further comprising the steps of:

(g) establishing a threshold energy measure;

(h) counting black pixels;

(i) reformatting bitmap image of the rectangular regions into a second format as text lines, the step reformatting further comprising the steps of:

(i1) designating an input pointer and an output pointer;

(i2) comparing the black pixels with the threshold energy measure; and (i3) wrapping the text lines having a number of black pixels greater than the threshold energy measure; and (j) displaying the text lines being formatted.

* * * * *